(12) United States Patent
Golshany et al.

(10) Patent No.: US 10,018,058 B2
(45) Date of Patent: Jul. 10, 2018

(54) LATERALLY REINFORCED VARIABLE PITCH ROTOR

(71) Applicant: The Boeing Company, Chicago, IL (US)

(72) Inventors: Sina Golshany, Lynnwood, WA (US); Todd W. Erickson, Fife, WA (US)

(73) Assignee: The Boeing Company, Chicago, IL (US)

( * ) Notice: Subject to any disclaimer, the term of this patent is extended or adjusted under 35 U.S.C. 154(b) by 401 days.

(21) Appl. No.: 14/798,788

(22) Filed: Jul. 14, 2015

(65) Prior Publication Data

US 2017/0016337 A1  Jan. 19, 2017

(51) Int. Cl.
*F01D 25/06* (2006.01)
*F01D 7/00* (2006.01)
*B64C 11/32* (2006.01)

(52) U.S. Cl.
CPC ............... *F01D 7/00* (2013.01); *B64C 11/32* (2013.01); *F01D 25/06* (2013.01)

(58) Field of Classification Search
CPC ..... F01D 5/22; F01D 5/24; F01D 7/00; B64C 11/30; B64C 11/32
See application file for complete search history.

(56) References Cited

U.S. PATENT DOCUMENTS

| | | | |
|---|---|---|---|
| 1,618,274 A | * | 2/1927 | Davis ................. F01D 5/24 29/889.21 |
| 2,541,098 A | | 2/1951 | Redding |
| 4,762,466 A | | 8/1988 | Bouiller et al. |
| 2015/0078888 A1 | | 3/2015 | Golshany et al. |

FOREIGN PATENT DOCUMENTS

GB        1195963 A       6/1970

* cited by examiner

*Primary Examiner* — Logan Kraft
*Assistant Examiner* — Sabbir Hasan
(74) *Attorney, Agent, or Firm* — Felix L. Fischer

(57) ABSTRACT

A propulsion unit having reduced noise employs a rotor having a plurality of variable pitch blades. A tensioning joint mechanism is carried within each blade and a tension element is engaged by the tension joint mechanism. The tension element is configured to maintain tension between the blades in the rotor and the tensioning joint mechanism adapted to allow variation of pitch of the blades without altering tension in the tension element.

19 Claims, 7 Drawing Sheets

LATERALLY REINFORCED VARIABLE PITCH ROTOR

BACKGROUND INFORMATION

Field

Embodiments of the disclosure relate generally to the field of structural reinforcement of aerodynamic rotors and more particularly to a structure for increasing stiffness by exerting a correcting lateral force to fan blades in an aerodynamic rotor at constant stations along blade span while allowing the blade pitch to vary as desired without affecting the correcting lateral force.

Background

Modern aircraft employ aerodynamic blades for generating propulsion for thrust and lift in various configurations and applications. There is a significant need for reducing noise generated by aircraft propulsion systems while improving their fuel efficiency. In particular, turbofan engines with high by-pass ratio are of utmost interest, as they can readily enable large improvements in fuel burn, with fairly low technology risk exposure. These engines typically utilize large diameter fans, with fixed pitch blades cantilevered at one end to a rotating hub at the center of the fan. However, to allow optimal performance at various phases of flight, these large diameter rotors are designed to enable the blade pitch angle to be varied and to allow the blades to cope with large variations in thrust setting, airspeed and altitude with relatively small variations in rotational speed. As the fan diameter increases, the fan blades exhibit lower stiffness (i.e. more flexibility). The resulting flexibility causes the aerodynamic and aeroacoustics properties of the rotor to suffer due to small and unsteady blade deformations resulting from disturbance under light loading, particularly during cruise, descent and approach. This leads to a pronounced buzz-saw like noise, as well as a reduction in rotor efficiency due to these small deformations (since the blade cannot precisely maintain the intended outer mold line due to the lowered stiffness). This is particularly true of long slender blades utilized in large diameter ducted and unducted propulsion systems. Moreover, these engines are typically exposed to a highly distorted flow fields due to a lack of a full-length inlet that can reduce the upstream distortion in the airflow.

It is therefore desirable to provide a structure for support to offset reduced stiffness for enhancement of aerodynamic and acoustic properties of propulsion rotors. It is further desirable that the provided structure accommodate varying blade pitch angle.

SUMMARY

Embodiments disclosed herein provide a propulsion unit having reduced noise with a rotor having a plurality of variable pitch blades. A tensioning joint mechanism is carried within each blade and a tension element is engaged by the tension joint mechanism. The tension element is configured to maintain tension between the blades in the rotor and the tensioning joint mechanism adapted to allow variation of pitch of the blades without altering tension in the tension element.

In an exemplary embodiment a reduced noise aerodynamic rotor employing the plurality of variable pitch blades has at least two tensioning joint mechanisms carried within each blade and spaced for each tensioning joint mechanism to provide an acoustic node. At least two tension elements are used, one tension element engaged by a respective one of the at least two tension joint mechanisms in each blade. The tension elements are configured to maintain tension between the blades in the rotor and said tensioning joint mechanisms adapted to allow variation of pitch of the blades without altering tension in the tension element.

The embodiments provide for a method for noise reduction in an aerodynamic rotor by connecting blades of a rotor with at least one tension element. A lateral correcting force is then exerted on the blades with the at least one tension element to establish acoustic nodes to modulate deformation wavelength of the blades.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
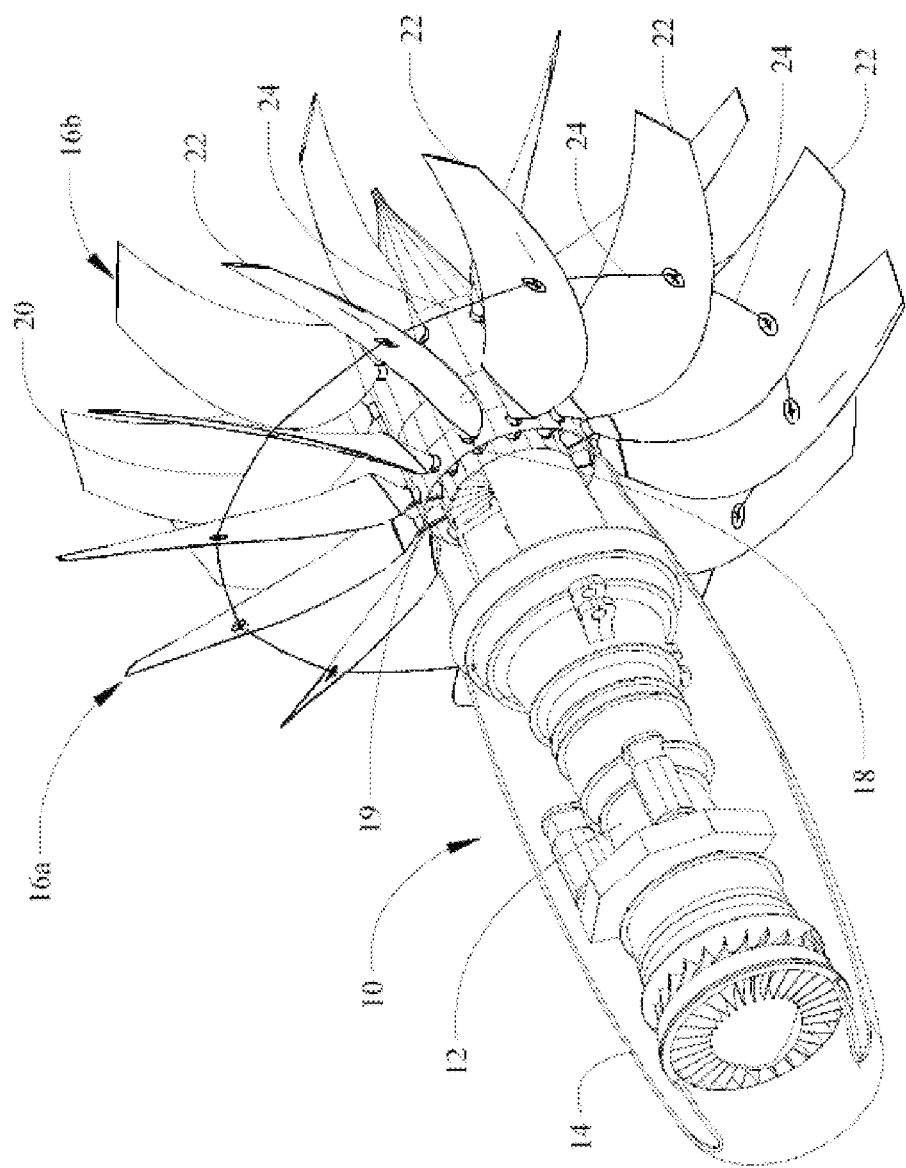
FIG. 1 is a partial section perspective view of an exemplary aircraft propulsion system employing an embodiment of a laterally reinforced variable pitch rotor as disclosed herein.

Embodiments disclosed herein provide a structure for increasing stiffness by exerting a correcting lateral force to fan blades in an aerodynamic rotor at a constant station along blade span while allowing the blade orientation (i.e. pitch) to vary as desired without affecting the correcting lateral force. The additional stiffness results in noise reduction and propulsive performance improvement. Referring to the drawings, FIG. 1 shows an exemplary propulsion unit, a turbofan gas turbine engine for the embodiment shown, having a laterally reinforced variable pitch rotor providing the desired lateral force between blades in the rotor. Propulsion unit 10 employs an engine core 12 housed in a nacelle 14. In the embodiment shown, the engine core 12 drives two pusher blade rotors 16a and 16b through a transmission 18 which include blade pitch controllers 19. While described herein with respect to a pusher configuration, the embodied structure may be employed in a propulsion unit having a tractor configuration or any propeller or rotor configuration for thrust or lift including helicopter rotor configurations and may also be employed in wind turbines or marine propeller applications.

A tension element 20, desirably having an airfoil shape, interconnects individual blades 22 in the rotor (shown in rotor 16a only in the drawing). The blades 22 have adjustable pitch for aerodynamic efficiency with the pitch controlled by the blade pitch controllers 19. For the exemplary embodiment the tension element 20 engages the blades 22 at approximately 60% of the span length of the blades. The tension element 20 may employ tension segments 24 between adjacent blades 22. The tension segments may be formed to have an aerodynamic shape or may be housed within an airfoil shaped fairing. The airfoil shape of the tension segments 24 of tension element 20 minimize pressure drag exerted on the tension element and generate a lift force, pointing inward towards the rotor hub, to augment/reduce the deformation of the individual tension segments and overall tension element.

Figure 2A:
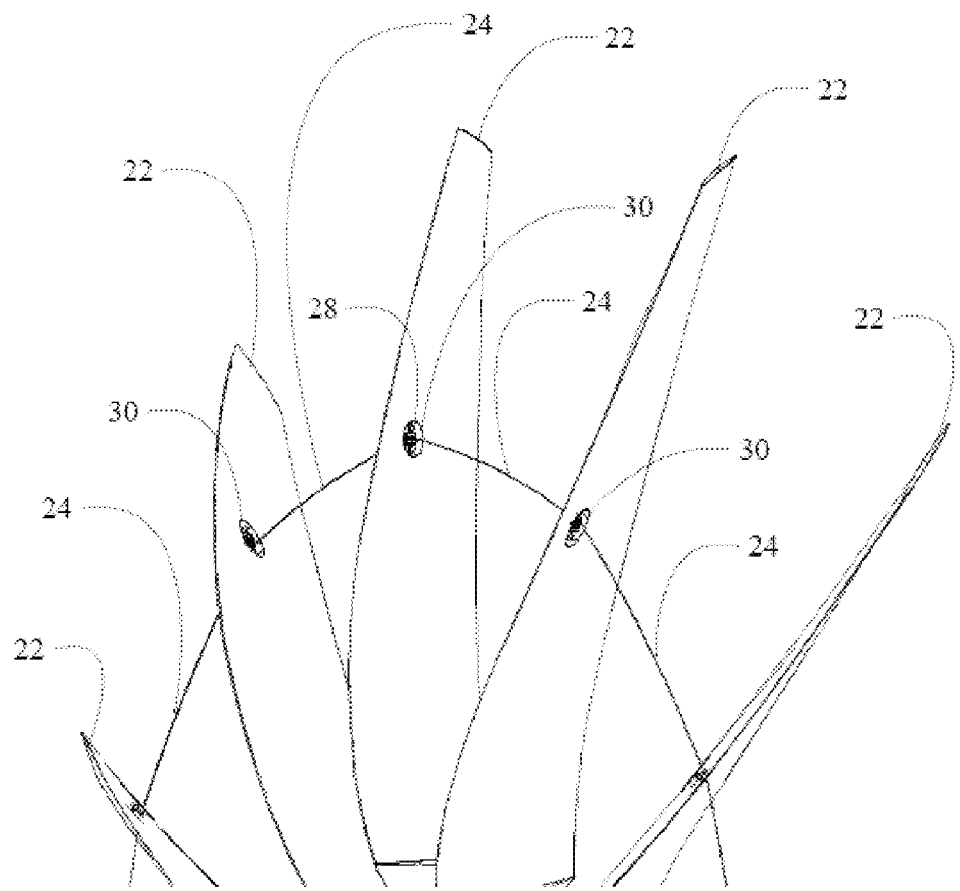
FIG. 2A is a detailed partial perspective view of the rotor of FIG. 1 showing individual rotor blades incorporating the embodiment described herein.
Figure 2B:
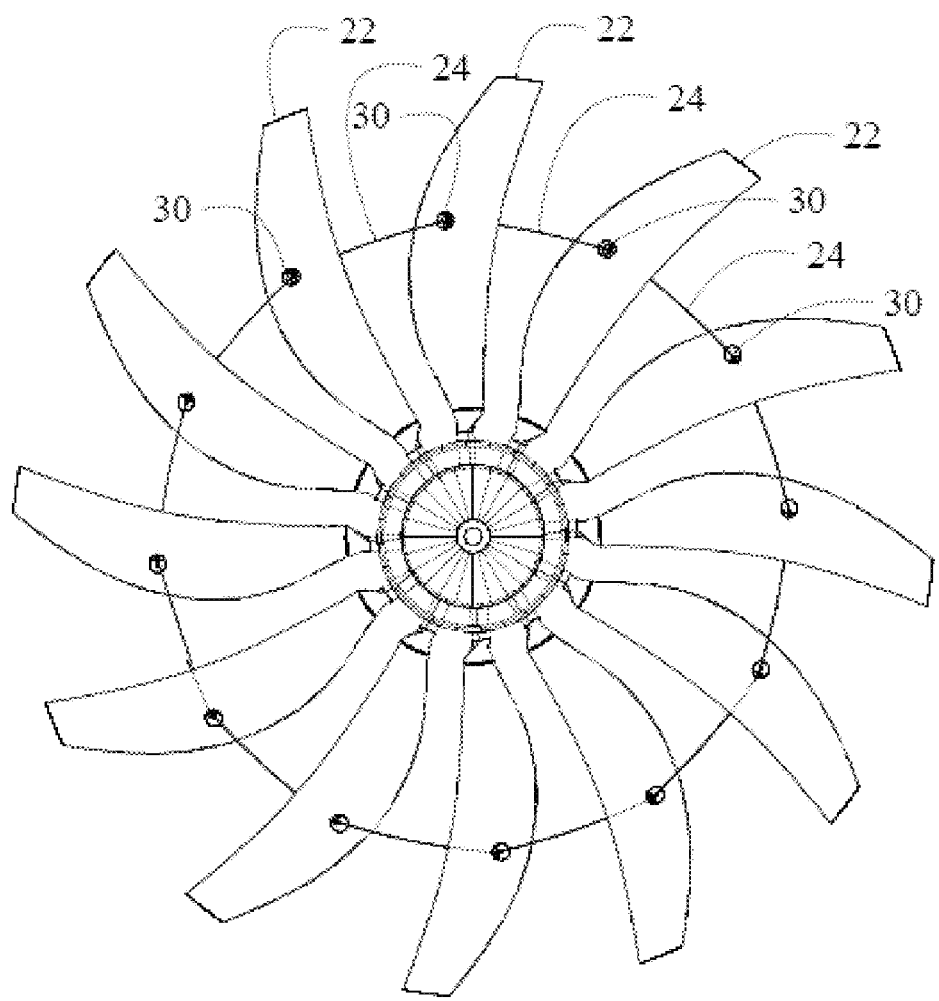
FIG. 2B is a detailed partial front view of the rotor as shown in FIG. 2A.

As seen in FIGS. 2A and 2B, the tension segments 24 of tension element 20 are received in each blade 22 by a tensioning joint mechanism 28 carried within the blade, the tensioning joint mechanism allowing pitch change in the blade without altering tension in the tension element. In the exemplary embodiment, each blade 22 has a cavity 30 in which the tensioning joint mechanism 28 is housed. For the embodiments shown the cavity is elliptical in shape but may be any arbitrary geometric shape to accommodate the tensioning joint mechanism. The tension joint mechanism 28 can be located anywhere within the span of the blade, including at the tip of the blade. In the tip-mounted configuration, an aerodynamic fairing would be fitted to minimize the aerodynamic drag of the tension joint mechanism. In cases where the tension joint assembly is imbedded within the outer mold line (OML) of the blades, the cavity 30 would be sealed using a cover or membrane (not shown) to maintain the aerodynamic characteristics of the blade. The cover may have a slot sealed by an elastic washer through which the tension segments 24 are received allowing relative motion between the blade and tension segments and/or fairing of the tension element during pitch changes of the blade. The tension segments 24 may be substantially linear between the tensioning joint mechanisms in adjacent blades as shown in the drawings and may flex during operation. A linear tension segment is ideal from aerodynamic stand point as it has the minimal wetted area. However, under centrifugal loading induced by the rotation of the rotor, a straight line would deform to a curved shape, the geometry depending on the magnitude of the end loads, density of the material of the tension segments, their cross-section, rotational speed of the rotor, and the aerodynamic properties of the elements. In alternative embodiments, the tension segments may be circular arcs forming the tension element in a ring shape.

Figure 3A:
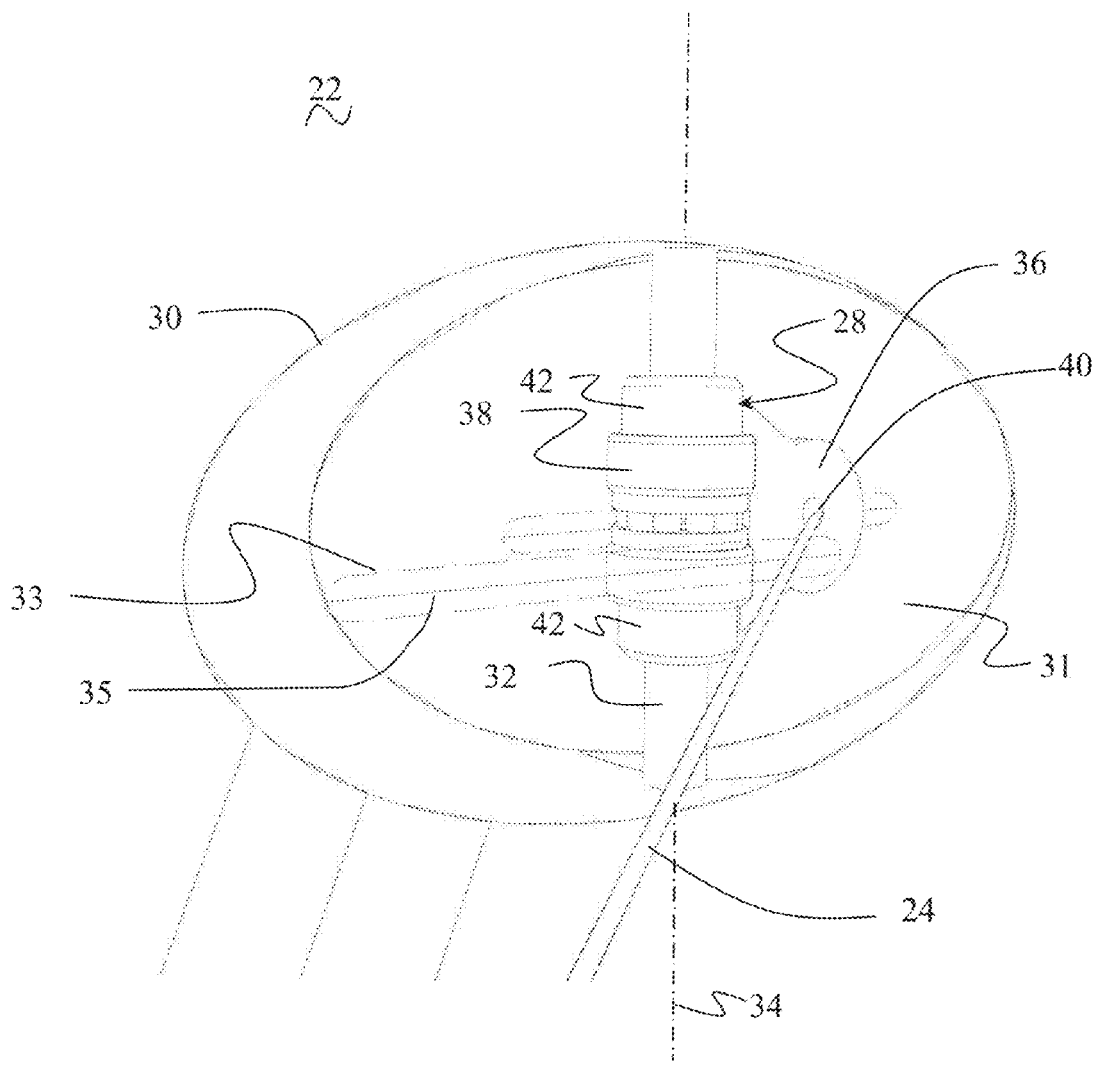
FIG. 3A is a close up perspective view of a tensioning joint mechanism employed in the exemplary embodiment.

Details of the structure of the tensioning joint mechanism 28 are seen in FIG. 3A. The tensioning joint mechanism 28 may be carried by the structural spine 32 of the blade 22. A geometric axis 34 of the blade provides the axis of rotation for the variable pitch system of the blade. A connector 36 extends from a support bearing 38 for attachment of the tension segments 24. A clamping bushing 40 or similar device may be employed for engagement of the tension segments 24. Alternatively, the tension segments can be welded or glued to the clamping bushing after assembly using a variety of methods known to art. The tension segment 24 is received through the clamping bushing 40 in the connector in each blade 22. As previously described, the cavity 30 would be sealed using a cover or membrane 31 (shown in phantom) with a slot 33 sealed by an elastic washer 35 through which the tension segment 24 is received allowing relative motion between the blade and tension segments during pitch changes of the blade. For the embodiment shown, each tension segment 24 has a substantially linear shape between blades 22 as previously described. Each clamping bushing 40 in each blade 22 is adjusted to provide proper tension with respect to that blade in the rotor. The tension element 20 may be a single continuous structural element which is threaded through or received in the clamping bushing 40 to define the tension segments 24 or the tension element may be multiple separate structural pieces each piece attached at the clamping bushings of adjacent blades forming one of the tension segments. The support bearing 38 is carried on the structural spine 32 by end bushings 42 which constrain the bearing on the structural spine. The support bearing 38 provides for rotation of the blade 22 about axis 34 to effect pitch change without rotation of the connector 36 which remains in a substantially fixed position relative to the spine 32 to maintain the substantially constant lateral force between the blades 22 exerted by the tension segments 24. A ball bearing is shown in the drawings as the support bearing 38. However, in alternative embodiments other bearing configurations or a lubricous sleeve and bushing may be employed.

The physical structure of the tensioning joint mechanism and tension element can be manufactured using various materials and processes. Hot forging is employed in exemplary embodiments for all light weight metals as it re-aligns the grains of the material to the geometry of the joint, and therefore allows for superior mechanical properties and fatigue resistance. Machining from raw material or machining and casting combinations may be employed in alternative embodiments. The bearing elements in the support bearing 38 may be manufactured to the specific requirements imposed by blade (or spine) geometry, vibration and acoustic fatigue conditions the tensioning joint mechanism is exposed to, or other mechanical and maintainability requirements.

Figure 3B:
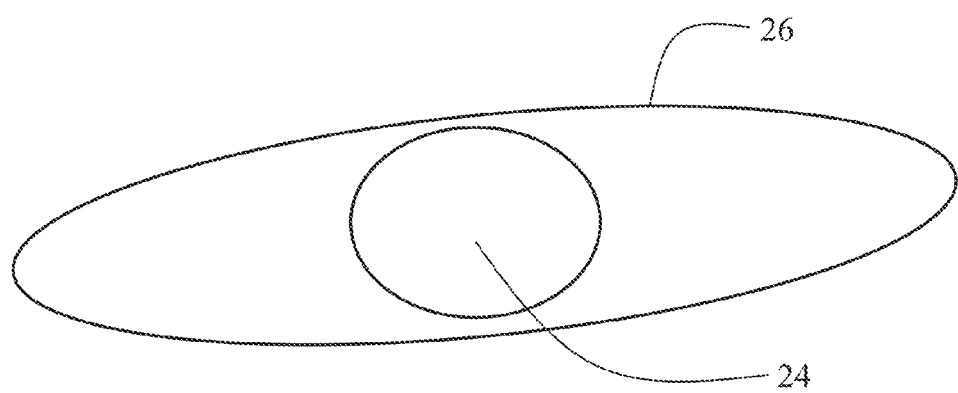
FIG. 3B is a section view of an exemplary tension segment with an aerodynamic fairing.

The tension element 20 and tension segments 24 may be produced using various materials. In certain embodiments the tension element is fabricated from metallic materials using the deep drawing process to obtain the shape, dimensions, and surface quality necessary to minimize aerodynamic drag and withstand mechanical and acoustic loadings anticipated. In case of a composite build, the tension element can be braided and injected with resin. In either application, the tension segments 24 may be a separately fabricated element with an aerodynamic fairing 26 installed over the tension segments (as represented in FIG. 3B) or the tension segments may be integrally formed with the aerodynamic shape to create the tension element.

The embodiments disclosed herein provide a mechanism to significantly reduce noise produced by bladed rotors in a propulsion unit. "Buzz-saw" tones, also known as combination or multiple pure tones, are generated when the rotor-blade Mach number relative to the incident airstream exceeds unity at any point along the blade span. In an ideal rotor the shock waves produced would propagate away from the rotor parallel to one another and produce tones solely at the blade-passing frequency and its harmonics. In a real rotor, slight mechanical and aeroelastic differences between the blades cause the shock waves to leave the blades with differing strengths and at different angles to the rotor face. As a result, as the shock waves propagate, they merge and the pressure pattern produced reflects the non-uniformities present at the blades. The sound produced is therefore no longer at just the blade-passing frequency and its harmonics but now contains energy that is a function of shaft and blade natural frequency and its harmonics. These shaft-order components are known as "buzz-saw" noise.

Figure 4:
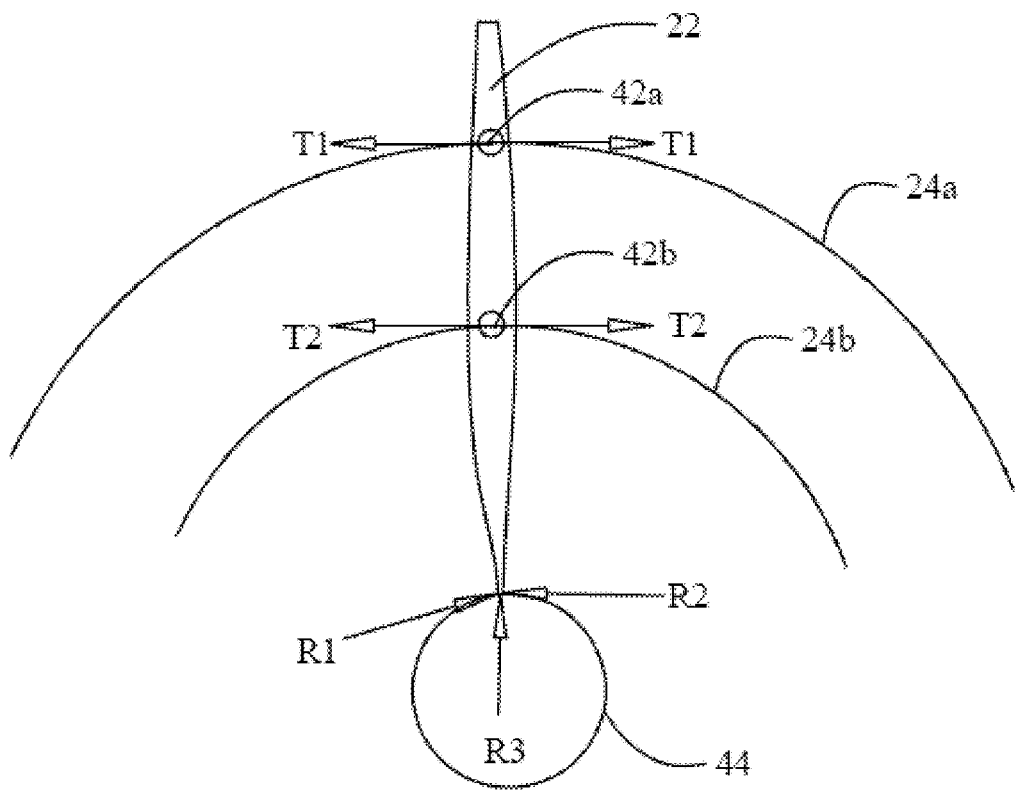
FIG. 4 is a schematic diagram of reaction forces on a rotor blade in the laterally reinforced variable pitch rotor with two reinforcement rings; and, FIG. 5 is a flow chart of operation of the thermoelectric generator for distributed generation of power for auxiliary system or sensor use.

For the embodiment of FIGS. 1 and 2, only a single tension element with the associated tension segments is employed. Additional beneficial effects with respect to noise reduction may be obtained by employing multiple tension elements/tension segments at optimal stations along the span length of the blades in the rotor. FIG. 4 demonstrates schematically an embodiment employing two concentric tension segments 24a and 24b in the rotor. The tension segments 24a, 24b attach to each blade 22 with a tensioning joint mechanism as previously described for the single tension element embodiment. Tension segment 24a creates a first node 42a on blade 22 while tension segment 24b creates a second node 42b. The tension segment 24a provides equal and opposite tension force on the blade 22 at node 42a as represented by arrows $T_1$ while tension segment 24b provides equal and opposite tension force on the blade 22 at node 42b as represented by arrows $T_2$. The rotor hub 44 provides reaction forces for each blade 22 as represented by arrows $R_1$, $R_2$ and $R_3$.

For each tension element added to the system, an extra acoustic node is added to each blade, which modulates the wave length of the blade deformation by:

$$\lambda_1 \rightarrow \frac{\lambda_1}{(n+1)}.$$

This leads to a shift of any given excitation frequency of the blade, $f_1$, to $f_2$ in the following way:

$$\frac{f_1}{f_2} = \frac{a/\lambda_1}{a/\lambda_2} = \frac{a/\lambda_1}{a/\left(\frac{\lambda_1}{n+1}\right)} = \frac{1}{n} \xrightarrow{\lambda_2 = \frac{\lambda_1}{n+1}} f_2 = (n+1)f_1$$

a≡Propagation Speed (in blade material)
λ≡Wave length of the excitation
n≡Number of acoustic nodes.

This allows the natural frequency of the blade to also shift to a higher value and therefore away from the blade passage frequency:

$$\omega_{0_2} = (n+1)\omega_{0_1}$$

The natural frequency of the blade will therefore be increased by a factor of (n+1), where n is the number of added tension elements. This is particularly effective for very high activity factor blades (long, slender) such as those usually found in helicopters or wind turbines.

The analysis described assumes equal spacing of the tension elements on the blade span length. However, alternative spacing may be employed and may assist in addressing specific frequency generation by a particular rotor size or configuration. Additionally, more than two tension elements may be employed to introduce additional nodes.

Figure 5:
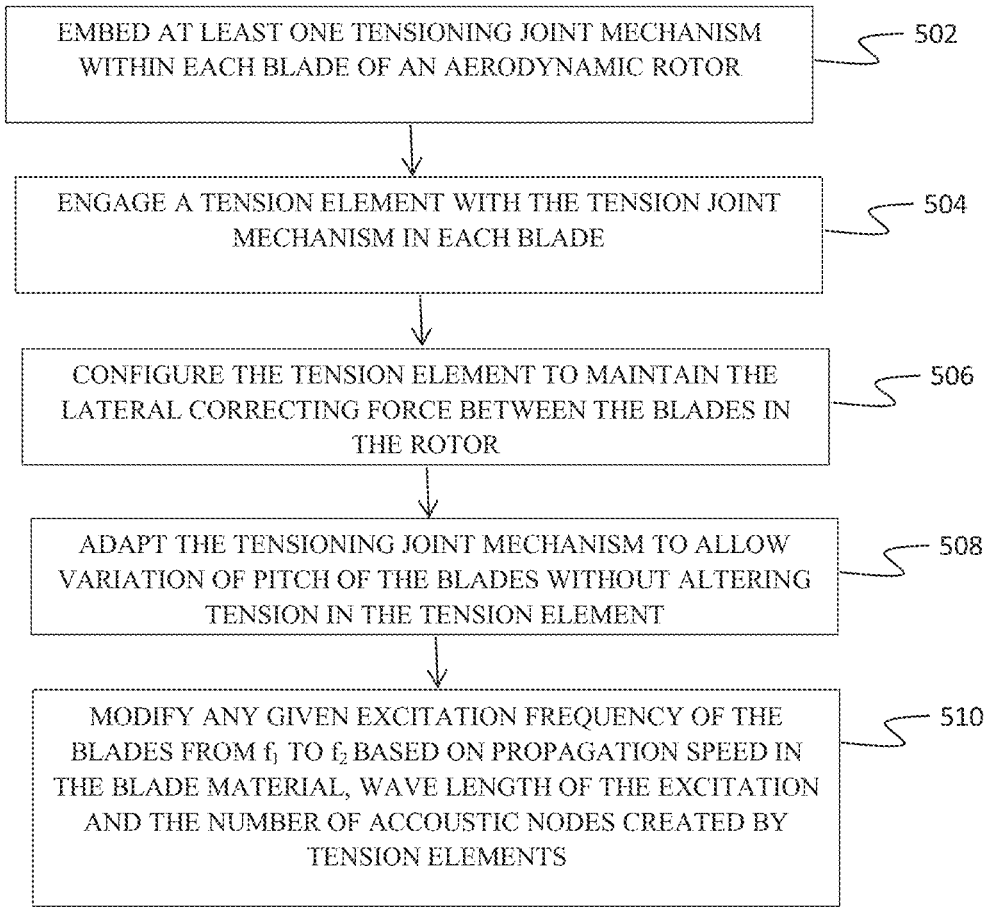

The embodiments described provide a method for noise reduction in bladed rotors as shown in FIG. 5. Blades of a rotor are connected with at least one tension element. Connecting blades with the tension element may be accomplished by embedding at least one tensioning joint mechanism within each blade, step 502, and engaging the at least one tension element with the at least one tension joint mechanism in each blade, step 504. A lateral correcting force is exerted by the at least one tension element on the blades to establish acoustic nodes to modulate deformation wavelength of the blades. The tension element is configured to maintain the lateral correcting force between the blades in the rotor, step 506, and the tensioning joint mechanism is adapted to allow variation of pitch of the blades without altering tension in the tension element, step 508. Any given excitation frequency of the blades is modified from $f_1$ to $f_2$, step 510 by $$\frac{f_1}{f_2} = \frac{a/\lambda_1}{a/\lambda_2} = \frac{a/\lambda_1}{a/\left(\frac{\lambda_1}{n+1}\right)} = \frac{1}{n} \xrightarrow{\lambda_2 = \frac{\lambda_1}{n+1}} f_2 = (n+1)f_1$$

where
a≡Propagation Speed (in blade material)
λ≡Wave length of the excitation
n≡Number of acoustic nodes.

As previously described, a support bearing may be mounted to allow rotation of the blade relative to an axis for pitch change and a connector is extended from the bearing fixed relative to pitch change of the blade. The at least one tension element is then attached to the connector. A clamping bushing in the connector may be employed.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A propulsion unit having reduced noise comprising:
a rotor having a plurality of variable pitch blades;
a tensioning joint mechanism carried within each blade;
a tension element engaged by the tension joint mechanism in each blade, said tension element configured to maintain tension between the blades in the rotor and said tensioning joint mechanism adapted to allow variation of pitch of the blades without altering tension in the tension element.

2. The propulsion unit as defined in claim 1 wherein the tension element has an airfoil shape.

3. The propulsion unit as defined in claim 1 wherein the tension element has a plurality of tension segments and an airfoil shaped fairing covering the tension segments.

4. The propulsion unit as defined in claim 1 wherein each blade has a cavity formed therein and the tension joint mechanism is installed in the cavity.

5. The propulsion unit as defined in claim 4 wherein the cavity has an elliptical shape.

6. The propulsion unit as defined in claim 1 wherein the tensioning joint mechanism comprises:
a support bearing mounted to allow rotation of the blade relative to an axis for pitch change;
a connector extending from the bearing and fixed relative to pitch change of the blade, said tension element attached to said connector.

7. The propulsion unit as defined in claim 6 wherein the tension element incorporates a tension segment and the tension segment is engaged by the connector with a clamping bushing.

8. The propulsion unit as defined in claim 6 wherein the support bearing is a ball bearing.

9. A reduced noise aerodynamic rotor comprising:
a plurality of variable pitch blades;
at least two tensioning joint mechanisms carried within each blade and spaced for each tensioning joint mechanism to provide an acoustic node;

at least two tension elements, one tension element engaged by a respective one of the at least two tension joint mechanisms in each blade, said tension elements configured to maintain tension between the blades in the rotor and said tensioning joint mechanisms adapted to allow variation of pitch of the blades without altering tension in the tension element.

10. The reduced noise aerodynamic rotor as defined in claim 9 wherein each tensioning joint mechanism comprises:
a support bearing mounted to allow rotation of the blade relative to an axis for pitch change;
a connector extending from the bearing and fixed relative to pitch change of the blade, said tension element attached to said connector.

11. The reduced noise aerodynamic rotor as defined in claim 10 wherein the tension element incorporates a tension segment and the tension segment is engaged by the connector with a clamping bushing.

12. The reduced noise aerodynamic rotor as defined in claim 9 wherein the acoustic nodes modulate a wave length of blade deformation of each blade by an amount equal to the wave length divided by the number of nodes plus one.

13. The reduced noise aerodynamic rotor as defined in claim 12 wherein any given excitation frequency of each blade is modified from $f_1$ to $f_2$ as $$\frac{f_1}{f_2} = \frac{a/\lambda_1}{a/\lambda_2} = \frac{a/\lambda_1}{a/\left(\frac{\lambda_1}{n+1}\right)} = \frac{1}{n} \xrightarrow{\lambda_2 = \frac{\lambda_1}{n+1}} f_2 = (n+1)f_1$$

where
a≡Propagation Speed (in blade material)
λ≡Wave length of the excitation
n≡Number of acoustic nodes.

14. The reduced noise aerodynamic rotor as defined in claim 13 wherein a natural frequency of each blade is increased by a factor of (n+1), where n is the number of nodes in the blade.

15. A method for noise reduction in an aerodynamic rotor comprising:
connecting blades of a rotor by
embedding at least one tensioning joint mechanism within each blade;
engaging at least one tension element with the at least one tension joint mechanism in each blade, the at least one tension element configured to maintain the lateral correcting force between the blades in the rotor and each tensioning joint mechanism adapted to allow variation of pitch of the blades without altering tension in the at least one tension element;
exerting a lateral correcting force on the blades with the at least one tension element to establish acoustic nodes to modulate deformation wavelength of the blades.

16. The method as defined in claim 15 wherein the deformation wavelength is modulated by an original wavelength divided by the number of acoustic nodes plus one.

17. The method as defined in claim 16 further comprising:
modifying any given excitation frequency of the blades from $f_1$ to $f_2$ by $$\frac{f_1}{f_2} = \frac{a/\lambda_1}{a/\lambda_2} = \frac{a/\lambda_1}{a/\left(\frac{\lambda_1}{n+1}\right)} = \frac{1}{n} \xrightarrow{\lambda_2 = \frac{\lambda_1}{n+1}} f_2 = (n+1)f_1$$

where
a≡Propagation Speed (in blade material)
λ≡Wave length of the excitation
n≡Number of acoustic nodes.

18. The method as defined in claim 15 wherein embedding at least one tensioning joint mechanism comprises:
mounting a support bearing to allow rotation of the blade relative to an axis for pitch change;
extending a connector from the bearing fixed relative to pitch change of the blade; and
attaching said at least one tension element to said connector.

19. The method as defined in claim 18 wherein the step of attaching said at least one tension element comprises engaging a tension segment in the tension element with a clamping bushing in the connector.

* * * * *